US011927212B2

(12) United States Patent
Estridge et al.

(10) Patent No.: US 11,927,212 B2
(45) Date of Patent: Mar. 12, 2024

(54) PRESS ON RETAINING WASHER FOR FASTENERS

(71) Applicant: BAE Systems Information and Electronic Systems Integration Inc., Nashua, NH (US)

(72) Inventors: Michael R. Estridge, Austin, TX (US); Mark J. Dube, McDade, TX (US); William J. Elliott, Kyle, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 17/710,171

(22) Filed: Mar. 31, 2022

(65) Prior Publication Data

US 2023/0313829 A1 Oct. 5, 2023

(51) Int. Cl.
*F16B 43/00* (2006.01)

(52) U.S. Cl.
CPC .................................. *F16B 43/003* (2013.01)

(58) Field of Classification Search
CPC ..... E03C 1/084; B62D 53/0842; F16B 43/00; F16B 43/003; F16B 43/001; F16B 5/0241; F16B 43/004
See application file for complete search history.

(56) References Cited

U.S. PATENT DOCUMENTS 2,896,863 A * 7/1959 Shames ................... E03C 1/084 239/109
3,181,584 A 5/1965 Borowsky
3,218,906 A * 11/1965 Dupree ................. F16B 41/002 411/533
3,275,390 A * 9/1966 Franks ............... B62D 53/0842 280/433

FOREIGN PATENT DOCUMENTS

JP H071324 U * 1/1995

OTHER PUBLICATIONS

Toray Plastics Precision Co Ltd; JPH071324U Machine Translation; Jan. 10, 1995 (Year: 1995).*
JP-H071324-U; Toray Plastics Precision Co Ltd (Year: 1995).*

* cited by examiner

*Primary Examiner* — Lee A Holly
(74) *Attorney, Agent, or Firm* — Sand, Sebolt & Wernow LPA; Gary McFaline

(57) ABSTRACT

A thin film-retaining washer with custom geometry that may further provide for a simple press-on installation while maintaining retention of fasteners during assembly, shipping, handling, and/or use of associated systems. The present retaining hardware is easily manufactured from sheet or film materials with minimal post-processing and may be scaled and optimized for use with multiple size and style of fasteners. Further, the thickness profile of the thin film retaining hardware facilitates lobe spring deflection to further provide secure retention of the associated fasteners.

11 Claims, 2 Drawing Sheets

36 14 18 30 10 16 12 22 28 24 20 D2 20 W 26 34 32 D1

38 12 10 36 30 16 28 24 34 32 40 26 14 40

PRESS ON RETAINING WASHER FOR FASTENERS

TECHNICAL FIELD

The present disclosure relates generally to fasteners and retaining hardware. More particularly, in one example, the present disclosure relates to retaining hardware for small, fine pitch fasteners operable to captivate these small threaded fasteners without requiring modifications to the fastener or related hardware. Specifically, in another example, the present disclosure relates to a thin film-retaining washer that may allow for simple press-on installation to retain small, fine pitch fasteners without requiring modifications thereto.

BACKGROUND

Electronic systems technology is a rapidly evolving field with a push towards microelectronics driven by both enhanced performance and miniaturization. In particular, there is an advantage for electronic systems that are reduced in size having smaller and more compact packaging. Generally, the field of microelectronics is therefore focused on creating the smallest form factor to fit in the smallest package.

As these electronic systems packages are assembled, they commonly utilize captive fasteners which are typically small threaded fasteners such as screws or the like to secure the various components of the electronic systems package together. As the systems are driven to smaller and more compact packaging, smaller threaded fasteners continue to be used typically utilizing standard #4 or smaller screws. Screws in this size range tend to be fine pitch and retaining hardware for use therewith tends to be limited in both form and availability.

Specifically, retaining hardware for small, fine pitch fasteners typically consists of threaded retaining devices, such as threaded washers, metal nuts, or the like, which can create difficulties in the use thereof and may further require modifications to the hardware to accommodate these threaded fasteners while still maintaining proper stack heights for the electronic systems package.

Current practice with threaded fasteners tends to involve modification of the screw to remove threads from the head of the screw down to just a few threads towards the tip thereof. Once then inserted into an electronic systems package, the screws are captivated by a threaded receiver formed in the packaging materials itself and by a threaded fastener, such as the threaded washers or metal nuts previously described above. The removal of threads from the screw can cause premature failure of the fastener as well as make it more difficult to assemble such electronic systems packages given the size and precision required to thread a threaded receiver onto the modified fastener.

In addition, as the availability of the retaining hardware for smaller, fine pitch fasteners is limited, it is typically the electronic systems package that is modified further to maintain proper stack heights of electrical connectors to allow use of whatever retaining hardware is available. For retaining hardware used with #4 or smaller fasteners, the availability of both inner and outer diameter measurements of the retaining hardware is extremely limited, again defining the capability and dimensions of the associated materials to accommodate these standard fasteners. In some instances, these accommodations may cause incomplete or less secure electrical connections, which may in turn lead to one or more components no longer retaining their normal function.

SUMMARY

The present disclosure addresses these and other issues by providing a thin film-retaining washer with custom geometry that may further provide for a simple press-on installation while maintaining retention of fasteners during assembly, shipping, handling, and/or use of associated systems. The present retaining hardware is easily manufactured from sheet or film materials with minimal post-processing and may be scaled and optimized for use with multiple size and style of fasteners. Further, the thickness profile of the thin film retaining hardware facilitates lobe spring deflection to further provide secure retention of the associated fasteners.

In one aspect, an exemplary embodiment of the present disclosure may provide a retaining washer comprising: a first side opposite a second side and defining a thickness therebetween; a central aperture defined through the washer; at least two notches evenly distributed about an inner edge of the washer and extending outward from the central aperture; and at least two lobes defined between the at least two notches; wherein the at least two lobes are flexible to permit operable engagement with a threaded fastener. This exemplary embodiment or another exemplary embodiment may further provide wherein the at least two notches and at least two lobes further comprise: a first lobe defined between a first notch and a second notch; a second lobe defined between the second notch and a third notch; a third lobe defined between the third notch and a fourth notch; and a fourth lobe defined between the fourth notch and the first notch. This exemplary embodiment or another exemplary embodiment may further provide wherein the washer is formed from a thin film material. This exemplary embodiment or another exemplary embodiment may further provide wherein the thin film material further comprises: one of a polymer film and a metal film. This exemplary embodiment or another exemplary embodiment may further provide wherein the thin film material is a polymer film further comprising: polyethylene terephthalate film. This exemplary embodiment or another exemplary embodiment may further provide wherein the thin film material is a polymer film further comprising: polyimide film. This exemplary embodiment or another exemplary embodiment may further provide wherein the washer is formed by one of die cutting and laser cutting the washer from a sheet of the thin film material. This exemplary embodiment or another exemplary embodiment may further provide wherein the thickness of the washer is less than a distance between two adjacent threads of the threaded fastener. This exemplary embodiment or another exemplary embodiment may further provide wherein the thickness of the washer is in a range between .002 and .005 inches with a margin of error of .001 inches. This exemplary embodiment or another exemplary embodiment may further provide wherein the thickness of the washer is .005 inches. This exemplary embodiment or another exemplary embodiment may further provide wherein the washer is operable to secure a fine pitch threaded fastener within an electronics module. This exemplary embodiment or another exemplary embodiment may further provide wherein the washer is a press fit washer.

In another aspect, an exemplary embodiment of the present disclosure may provide a method of assembling an electronics module comprising: inserting a threaded fastener through a cover, a flex board, and a spacer; pressing a thin film washer having at least two notches defining at least two lobes therebetween onto the threaded fastener; engaging the threaded fastener with a threaded hole defined in a base of the module; and applying torque to the threaded fastener to secure it within the threaded hole and to further tighten the thin film washer against the spacer. This exemplary embodiment or another exemplary embodiment may further provide cutting a washer from a thin film of material prior to inserting the threaded fastener through the cover, flex board, and spacer. This exemplary embodiment or another exemplary embodiment may further provide wherein cutting a washer from a thin film of material further comprises: cutting the washer from one of a polymer film and a metal film; wherein the act of cutting is accomplished by one of die cutting and laser cutting the washer from the thin film material. This exemplary embodiment or another exemplary embodiment may further provide wherein the thin film material is a polymer film further comprising: polyethylene terephthalate film. This exemplary embodiment or another exemplary embodiment may further provide wherein the thin film material is a polymer film further comprising: polyimide film. This exemplary embodiment or another exemplary embodiment may further provide wherein pressing the thin film washer onto the threaded fastener further comprises: flexing the at least two lobes of the thin film washer over the threads of the threaded fastener; and engaging an inner edge of the thin film washer with the threaded fastener between two adjacent threads of the threaded fastener. This exemplary embodiment or another exemplary embodiment may further provide wherein the inner edge of the thin film washer has a thickness that is less than a distance between the two adjacent threads of the threaded fastener. This exemplary embodiment or another exemplary embodiment may further provide wherein the thickness of the washer is .005 inches.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 2:
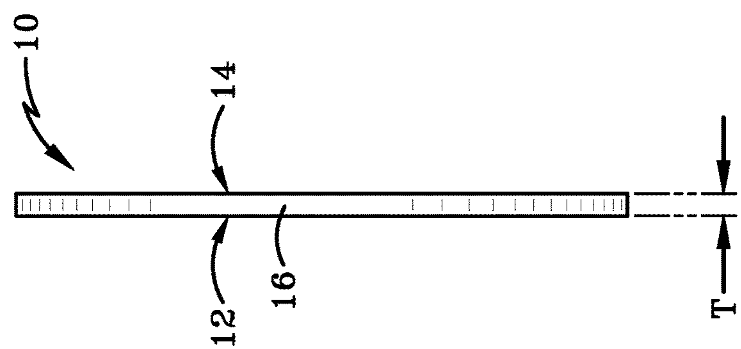
FIG. 2 is a side elevation view of an exemplary retaining washer according to one aspect of the present disclosure.
Figure 1:
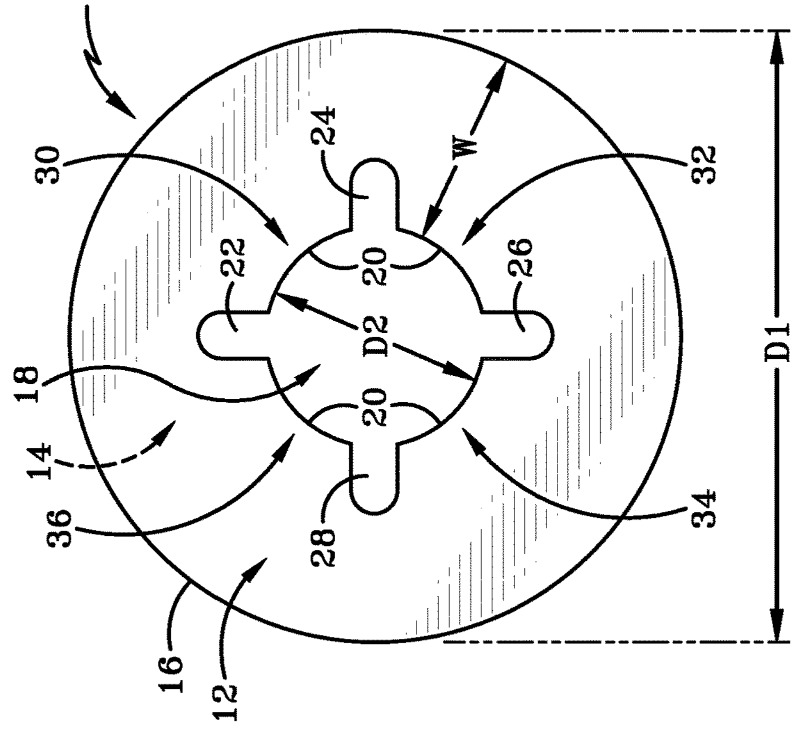
FIG. 1 is a front elevation view of an exemplary retaining washer according to one aspect of the present disclosure.

With reference to FIGS. 1 and 2, an exemplary retaining washer of the present disclosure is shown and generally indicated as retaining washer 10, or simply washer 10. Washer 10 may have a first side 12 opposite a second side 14 and defining the thickness T (FIG. 2) of the washer 10 therebetween. First and second sides 12 and 14 may be generally planar and parallel, although, not necessarily so as dictated by the desired implementation. As shown in the figures and described herein, washer 10 may be generally round and may have an outer edge 16 defining the outer diameter D1 of washer 10, as discussed further below. Washer 10 may further include a central aperture 18 defined therethrough and further defining an inner edge 20, which may have a second inner diameter D2 that may be smaller than the outer diameter D1 of washer 10. Second diameter D2 may be the diameter dimension that is most closely associated with the size of a threaded fastener, as discussed further below. The distance between the outer edge 16 and inner edge 20 may further define the width of washer 10.

Washer 10 may further include a first notch 22, a second notch 24, a third notch 26, and fourth notch 28. First through fourth notches 22, 24, 26, and 28 may be defined in the washer 10 extending outwardly from the inner edge 20 towards the outer edge 16 and may be evenly spaced about the circumference of central aperture 18. As illustrated, first notch 22 may be placed at a "12 o'clock" position on central aperture 18 with second notch 24, third notch 26, and fourth notch 28 at the "3 o'clock", "6 o'clock", and "9 o'clock" positions, respectively. Although described and shown with four evenly spaced notches 22, 24, 26, and 28, washer 10 may have any suitable number of notches in any suitable position as dictated by the desired implementation. It will be further understood that the naming convention utilized herein, i.e. first notch 22 at 12 o'clock with subsequent notches identified in a clockwise direction, is relative and exemplary for purposes of clarity in the disclosure. Accordingly, any of these notches 22, 24, 26, and 28 may be considered first notch 22, etc.

Each of first, second, third, and fourth notches 22, 24, 26, and 28 may extend from central aperture 18 into washer 10 towards the outer edge 16, as discussed herein. The distance by which notches 22, 24, 26, and 28 extend into the width W of washer 10 may further define the length of notches 22, 24, 26, and 28. The length of notches 22, 24, 26, and 28 may vary provided they do not exceed the entire width W of washer 10.

Notches 22, 24, 26, and 28 may be similarly sized and may further define a series of lobes therebetween. In particular, a first lobe 30 may be defined between first notch 22 and second notch 24; a second lobe 32 may be defined between second notch 24 and third notch 26; a third lobe 34 may be defined between third notch 26 and fourth notch 28; and a fourth lobe 36 may be defined between fourth notch 28 and first notch 22. These lobes 30, 32, 34, and 36 may represent a portion of retaining washer 10 that may interact with threads 40 of an associated fastener 38, as discussed further herein. Lobes 30, 32, 34, and 36 may vary in size, number, and/or position depending upon the number and length of notches provided, according to the desired implementation. According to one aspect, washer 10 may have at least two notches and at least two lobes, but may have any suitable number of notches and lobes as desired. Generally speaking, the longer the notches 22, 24, 26, and 28, the more flexible the lobes 30, 32, 34, and 36 will be, as discussed below.

Washer 10 is contemplated to be formed from a thin film material, which may include polymer or metal films as desired to meet a wide range of performance requirements of an associated device. Further, washer 10 is contemplated for use as press-on installation retaining hardware for use in electronic systems packaging of electronic components such as printed wiring boards (PWB), printed circuit boards (PCB), or the like. It will be understood that washer 10 may be utilized for any device employing small, fine pitch fasteners as desired. Similarly, washer 10 will be understood to be scalable in all dimensions including outer diameter D1, inner diameter D2, width W, and/or thickness T as desired and discussed further herein.

According to one aspect, washer 10 may be formed of a thin film polymer such as polyethylene terephthalate film or other similar polymer films. According to another aspect, washer 10 may be formed of polyimide film or other similar polyimide-based films. According to yet another aspect, washer 10 may be formed of any material that may be matched to the specific installation environment and may generally include all thin film materials, including polymer or metal films, or the like, to meet a wide range of performance requirements with associated systems.

Similarly, the dimensions of washer 10 may vary according to the specific use and installation thereof. According to one aspect, diameter D1 may be in a range of .05 inches to .25 inches +/−.002 inches while diameter D2 may be sized according to the fastener for use with washer 10 and may range from .005 to .1 inches +/−.002 inches. According to one example, when used with a #0 fastener, outer diameter D1 may be approximately .14 inches while inner diameter D2 may be approximately .05 inches. According to another example, when used with a #4 fastener, outer diameter D1 may be approximately .25 inches while inner diameter D2 may be approximately .095 inches. Thickness T of washer 10 may be in a range of .002 to .005 inches +/−.001 inches. According to the second example above, for a #4 fastener utilizing washer 10, thickness T may be approximately .005 inches. Again, it will be understood that these dimensions are scalable for use with multiple sizes and/or styles of fastener and these ranges and sizes provided herein are meant as exemplary dimensions and not limiting dimensions of washer 10.

Washer 10 may be manufactured using any suitable technique including laser cutting, die cutting, or the like. Generally speaking, laser cutting and/or die cutting manufacturing processes may allow for washers 10 to be easily manufactured from film sheets with minimal post-processing, which in turn provides that washers 10 may be quickly, inexpensively, and efficiently produced and the scalability of washers 10 may further allow for custom production to replace existing standard threaded retainers.

Figure 3:
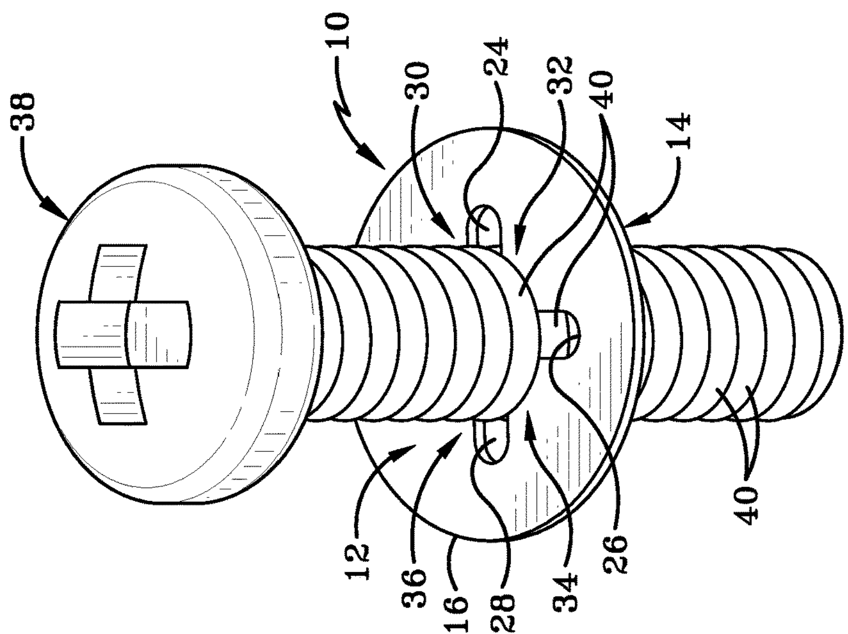
FIG. 3 is an operational view of an exemplary retaining washer as installed on an associated fastener according to one aspect of the present disclosure.

With reference to FIG. 3, one issue with current retaining hardware for use with size #4 or smaller fine pitch fasteners is that the smaller-sized retaining hardware is difficult to handle. Simultaneously the thickness of the smaller retaining hardware may further cause an increase in the stack height of an associated electronic module. Thus, the use of current threaded retainers tends to lead to the need to modify the hardware. There modifications tend to include, but are not limited to, removing threads from the fastener screw and/or modifying other components in the module to maintain a proper stack height. Even when a modification provides that the stack height is not affected, current retaining hardware must be held securely in place as the fastener is engaged therewith which can prove difficult and time consuming.

With continued reference to FIG. 3, the present washer 10 is contemplated to be configured to engage a fastener 38, such as a threaded screw, via a plurality of threads 40 defined thereon. In particular, washer 10 is contemplated as a press fit washer 10 meaning that washer 10 may engage the threads 40 through the application of force to one side 12 or 14, thereof causing first through fourth lobes 30, 32, 34, and 36 to flex slightly downward to provide clearance over each thread 40 of fastener 38. Once washer 10 is in the desired position on fastener 38, the thickness T of washer 10 may be sized as to allow the inner edge 20 of lobes 30, 32, 34, and 36 to engage the fastener 38 between adjacent threads 40 for secure attachment thereto. As torque is applied to fastener 38, washer 10 may further tighten (i.e. move up the threads 40) on fastener 38 while maintaining its grip thereon between inner edge 20 of lobes 30, 32, 34, and 36 and threads 40.

The thin film material from which washer 10 may be formed may provide flexibility in lobes 30, 32, 34, and 36 while simultaneously allowing washer 10 to be constructed with a thickness T that is less than the distance between adjacent threads 40 of the associated fastener 38 with which washer 10 may be utilized. This relationship between the thickness T of washer 10, the material of washer 10 (and other associated components), the distance between threads 40, and the design of the joint (i.e. all structures between fastener 38 and base 48, discussed below) may allow for a secure engagement between washer 10 and fastener 38 with minimal or negligible creep in the installed condition. According to one aspect, the material selected for the construction of washer 10 may be specific to the desired implementation to minimize creep.

The size of notches 22, 24, 26, and 28, or more particularly the length thereof, may provide the flexibility to lobes 30, 32, 34, and 36 to allow them to flex over threads 40 when washer 10 is being pressed on to fastener 38. The relationship between the size of notches 22, 24, 26, and 28 and the flexibility of lobes 30, 32, 34, and 36 is that the larger the notches 22, 24, 26, and 28 are, the more flex will be imparted into lobes 30, 32, 34, and 36.

Having thus described the features of washer 10 and the mechanism of attachment between washer 10 and an associated fastener 38, an exemplary use for washer 10 will now be described in further detail.

Figure 4:
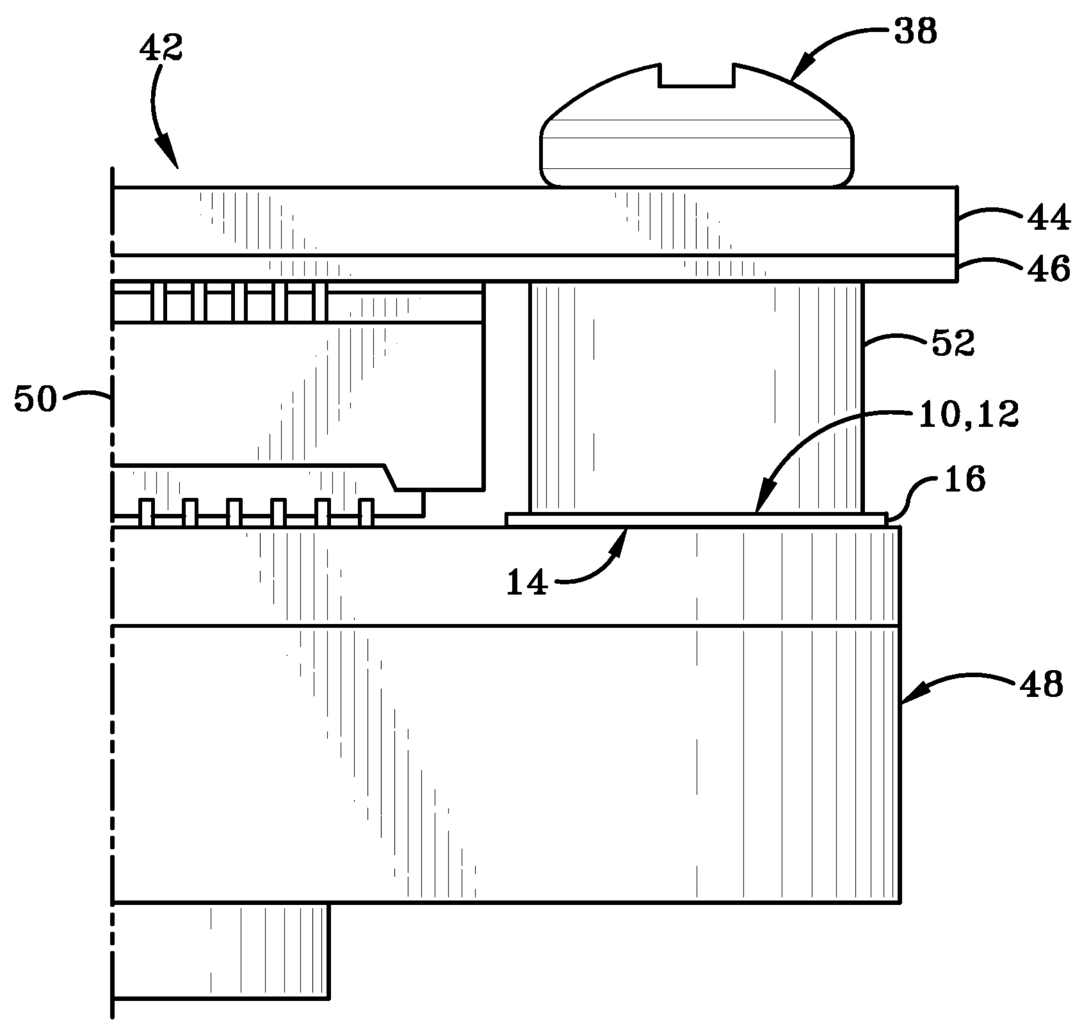
FIG. 4 is a side elevation operational view of an electronic systems module utilizing a retaining washer according to one aspect of the present disclosure.

With reference to FIG. 4, an exemplary use of washer 10 is shown with an exemplary electronics module 42. Module 42 may be any suitable electronic systems module or may be any other suitable device commonly secured together utilizing a threaded fastener in the appropriate size range. Module 42 may generally include a flex board 46 with a cover 44 (which may be or otherwise include integral stiffeners or other similar structures) disposed thereon and a base 48 which may include a threaded hole defined therein for operable engagement with a threaded fastener 38, as described further below. Typically, module 42 may be utilized for mated electronic connectors 50 or other suitable electronic components and related elements; however, it will be understood that module 42 may be any suitable device and may include additional components or omit recited components as desired or as dictated by the desired implementation. Therefore, it will be further understood that module 42 is an exemplary application of washer 10 with a threaded fastener 38, and not a limiting example thereof.

Currently, these components are secured together utilizing a threaded fastener such as fastener 38 and a threaded receiver such as a metal nut. According to the aspects and examples provided herein, however, in place of a threaded receiver such as a threaded nut, it is contemplated that retaining washer 10 may be utilized. In particular, with current solutions, the use of a threaded receiver may typically require modifications made to the threaded fastener 38, such as removing a portion of the threads therefrom, or may further include modifications to one or more of the cover 44, flex board 46, and/or base 48 as well as potential modifications to a spacer, such as spacer 52, to maintain an appropriate stack height to maintain the mated connectors 50 in operable engagement.

As shown in FIG. 4, the thin film material utilized in the manufacture of washer 10 may allow washer 10 to replace a standard threaded receiver, which may then further allow assembly of the electronics module 42 or similar device without modifications being made to the fastener 38, the spacer 52, or to any of the other components of the module 42. In particular, the thickness T of washer 10, as described above, allows operable engagement with the threads 40 of fastener 38, and may also provide the ability to maintain appropriate stack heights for module 42.

To utilize washer 10, a threaded fastener 38 may be inserted through the cover 44, flex board 46, and a spacer 52 of the module 42. Washer 10 may then be press-fit onto the threads of the fastener 38 to secure the spacer 52 to the flex board 46 and cover 44. The threaded fastener 38 may then be engaged with a threaded hole defined in the base 48 of the module 42 and may be fastened into place by applying torque thereto to screw the fastener 38 into the base 48. The act of applying torque to the fastener 38 will simultaneously cause the fastener 38 to engage the threaded hole in the base 48, but will also cause the washer 10 to be drawn tighter to the spacer 52, thus further facilitating the secure engagement of the washer 10 with the other components of module 42. Again, the thin film material from which the washer 10 may be constructed allows the stack height of the module to remain consistent and with parameters of the dictated installation, without the need to modify other components of the module 42.

Accordingly, the advantages realized by the present described washer 10 include improved methods of manufacture such as die cutting and/or laser cutting of washers 10 from thin film materials, a reduced size, weight, and cost, and a reduction in processing time as washers 10 may be readily cut to size on site and rapidly married with associated components and fasteners such as fasteners 38, without requiring additional modifications within the desired implementation hardware.

Further, because washers 10 may be scaled and precisely manufactured quickly, efficiently, and inexpensively, they may be readily adapted for use with legacy components and legacy systems while providing a secure engagement with threaded fastener 38 particularly in applications utilizing small fine pitch fasteners such as fasteners below size #4 as described herein.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or"clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified. Thus, as a non-limiting example, “at least one of A and B” (or, equivalently, “at least one of A or B,” or, equivalently “at least one of A and/or B”) can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term “effecting”or a phrase or claim element beginning with the term “effecting” should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of “effecting an event to occur” would mean that a first party is giving a second party the tools or resources needed for the second party to perform the event, however the affirmative single action is the responsibility of the first party to provide the tools or resources to cause said event to occur.

When a feature or element is herein referred to as being “on” another feature or element, it can be directly on the other feature or element or intervening features and/or elements may also be present. In contrast, when a feature or element is referred to as being “directly on” another feature or element, there are no intervening features or elements present. It will also be understood that, when a feature or element is referred to as being “connected”, “attached” or “coupled” to another feature or element, it can be directly connected, attached or coupled to the other feature or element or intervening features or elements may be present. In contrast, when a feature or element is referred to as being “directly connected”, “directly attached” or “directly coupled” to another feature or element, there are no intervening features or elements present. Although described or shown with respect to one embodiment, the features and elements so described or shown can apply to other embodiments. It will also be appreciated by those of skill in the art that references to a structure or feature that is disposed “adjacent” another feature may have portions that overlap or underlie the adjacent feature.

Spatially relative terms, such as “under”, “below”, “lower”, “over”, “upper”, “above”, “behind”, “in front of”, and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as “under” or “beneath” other elements or features would then be oriented “over” the other elements or features. Thus, the exemplary term “under” can encompass both an orientation of over and under. The device may be otherwise oriented (rotated 90 degrees or at other orientations) and the spatially relative descriptors used herein interpreted accordingly. Similarly, the terms “upwardly”, “downwardly”, “vertical”, “horizontal”, “lateral”, “transverse”, “longitudinal”, and the like are used herein for the purpose of explanation only unless specifically indicated otherwise.

Although the terms “first” and “second” may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to “an embodiment,” “one embodiment,”“some embodiments,” “one particular embodiment,” “an exemplary embodiment,” or “other embodiments,” or the like, means that a particular feature, structure, or characteristic described in connection with the embodiments is included in at least some embodiments, but not necessarily all embodiments, of the invention. The various appearances “an embodiment,” “one embodiment,” “some embodiments,” “one particular embodiment,” “an exemplary embodiment,” or “other embodiments,” or the like, are not necessarily all referring to the same embodiments.

If this specification states a component, feature, structure, or characteristic “may”, “might”, or “could” be included, that particular component, feature, structure, or characteristic is not required to be included. If the specification or claim refers to “a” or “an” element, that does not mean there is only one of the element. If the specification or claims refer to “an additional” element, that does not preclude there being more than one of the additional element.

As used herein in the specification and claims, including as used in the examples and unless otherwise expressly specified, all numbers may be read as if prefaced by the word “about” or “approximately,” even if the term does not expressly appear. The phrase “about” or “approximately” may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as “comprising,” “including,” “carrying,” “having,” “containing,” “involving,”“holding,” “composed of,” and the like are to be understood to be open-ended, i.e., to mean including but not limited to. Only the transitional phrases “consisting of” and “consisting essentially of” shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A retaining washer comprising:

a first side opposite a second side and defining a thickness therebetween;

a central aperture defined through the washer;

at least two notches evenly distributed about an inner edge of the washer and extending outward from the central aperture; and at least two lobes defined between the at least two notches;

wherein the at least two lobes are flexible to permit operable engagement with a threaded fastener; and wherein the thickness of the washer is less than a distance between two adjacent threads of the threaded fastener.

2. The retaining washer of claim 1 wherein the washer is formed from a thin film material.

3. The retaining washer of claim 2 wherein the thin film material further comprises:

one of a polymer film and a metal film.

4. The retaining washer of claim 3 wherein the thin film material is a polymer film further comprising:

polyethylene terephthalate film.

5. The retaining washer of claim 3 wherein the thin film material is a polymer film further comprising:

polyimide film.

6. The retaining washer of claim 3 wherein the washer is formed by one of die cutting and laser cutting the washer from a sheet of the thin film material.

7. The retaining washer of claim 1 wherein the thickness of the washer is in a range between .002 and .005 inches with a margin of error of .001 inches.

8. The retaining washer of claim 7 wherein the thickness of the washer is .005 inches.

9. The retaining washer of claim 1 wherein the washer is operable to secure a fine pitch threaded fastener within an electronics module.

10. The retaining washer of claim 9 wherein the washer is a press fit washer.

11. The retaining washer of claim 1 wherein the at least two notches and at least two lobes further comprise:

a first lobe defined between a first notch and a second notch;

a second lobe defined between the second notch and a third notch;

a third lobe defined between the third notch and a fourth notch; and a fourth lobe defined between the fourth notch and the first notch.

* * * * *